United States Patent [19]
Lai

[11] Patent Number: 5,251,610
[45] Date of Patent: Oct. 12, 1993

[54] SOLAR HEATER ASSEMBLY

[76] Inventor: Herman Lai, No. 25, Ta Chin Rd., Taichung, Taiwan

[21] Appl. No.: 994,656

[22] Filed: Dec. 22, 1992

[51] Int. Cl.⁵ .............................. F24J 2/00; F24J 2/38
[52] U.S. Cl. .................................... 126/608; 126/600
[58] Field of Search .............. 126/600, 608, 704, 680, 126/681, 682

[56]  References Cited
U.S. PATENT DOCUMENTS

| | | | |
|---|---|---|---|
| 277,884 | 5/1883 | Clark | 126/681 |
| 2,859,745 | 11/1958 | Von Brudersdorff | 126/681 |
| 3,999,389 | 12/1976 | Bryce | 126/600 X |
| 4,655,196 | 4/1987 | Kerr | 126/681 X |
| 4,848,320 | 7/1989 | Burns et al. | 126/680 X |

*Primary Examiner*—Carl D. Price
*Attorney, Agent, or Firm*—Woodcock Washburn Kurtz Mackiewicz & Norris

[57]  ABSTRACT

A solar heater includes a pair of tracks disposed longitudinally on the side portions, a container including a pair of wheels rotatably engaged in the tracks, a number of orifices formed in each of the tracks, and a pair of supports having one end engageable with either of the orifices so as to support the solar heater and the container in a slope.

8 Claims, 6 Drawing Sheets

SOLAR HEATER ASSEMBLY

BACKGROUND OF THE INVENTION

1. Field of the Invention

The present invention relates to a solar heater, and more particularly to a solar heater assembly whose facing directions can be adjusted.

2. Description of the Prior Art

A typical solar heater is shown in FIG. 6 and comprises a body 50 supported on a frame 51 with a slope, a container 52 disposed on the upper portion of the body 50, a pipe 53 and a tube 54 coupled between the body 50 and the container 52 for circulating water between the body 50 and the container 52. However, the frame 51 is solidly fixed on the supporting surface such that the facing direction of the body 50 can not be adjusted.

The present invention has arisen to mitigate and/or obviate the afore-described disadvantages of the conventional solar heaters.

SUMMARY OF THE INVENTION

The primary objective of the present invention is to provide a solar heater assembly in which the direction of the solar heater can be adjusted.

In accordance with one aspect of the invention, there is provided a solar heater assembly comprising a container for supporting liquid, a solar heater secured to the container and including at least one track longitudinally disposed thereon, a plurality of orifices formed in the track, and at least one support including a first end engageable with either of the orifices so as to support the solar heater and the container in a slope. The solar heater assembly can be adjusted to different angular positions according to the sun shine such that the solar energy absorbing effect is greatly increased.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
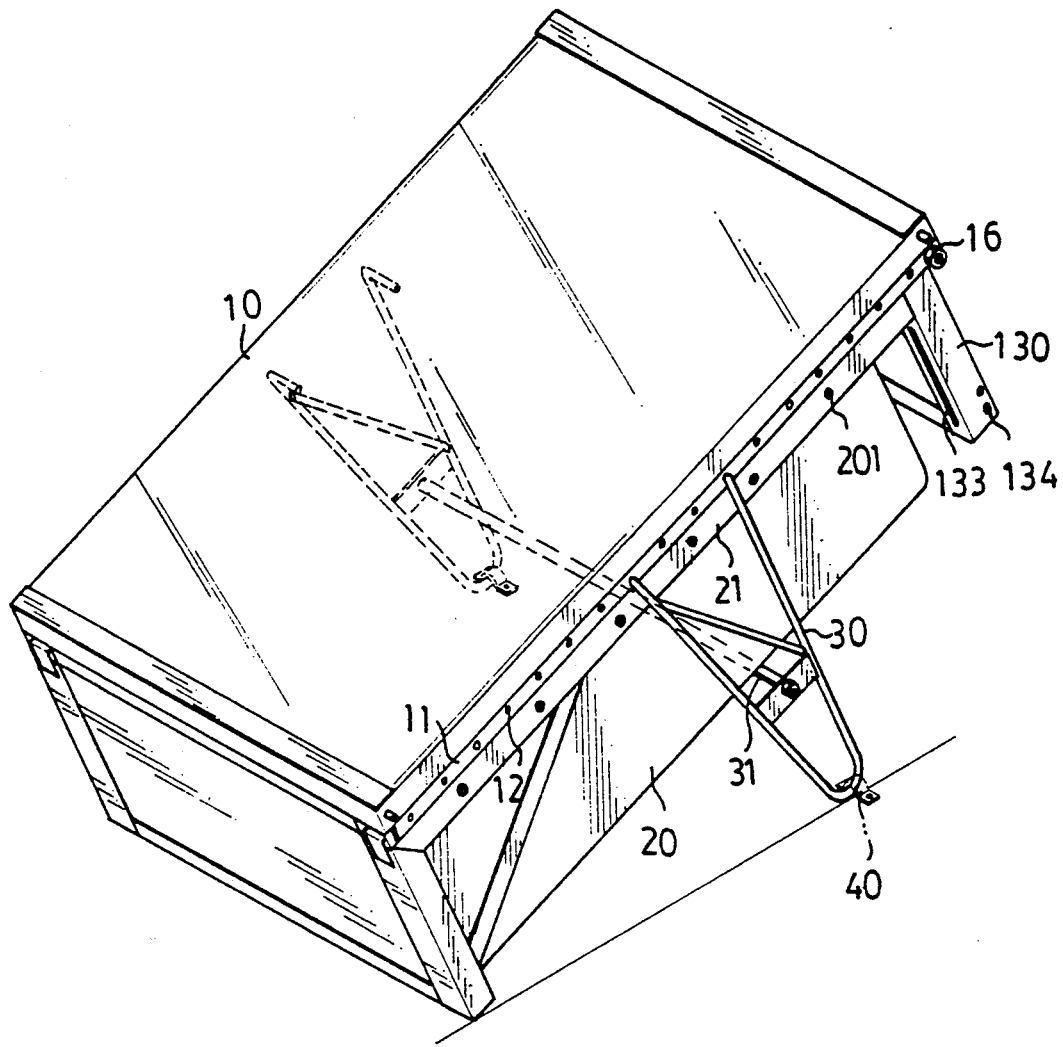
FIG. 1 is a perspective view of a solar heater assembly in accordance with the present invention.
Figure 2:
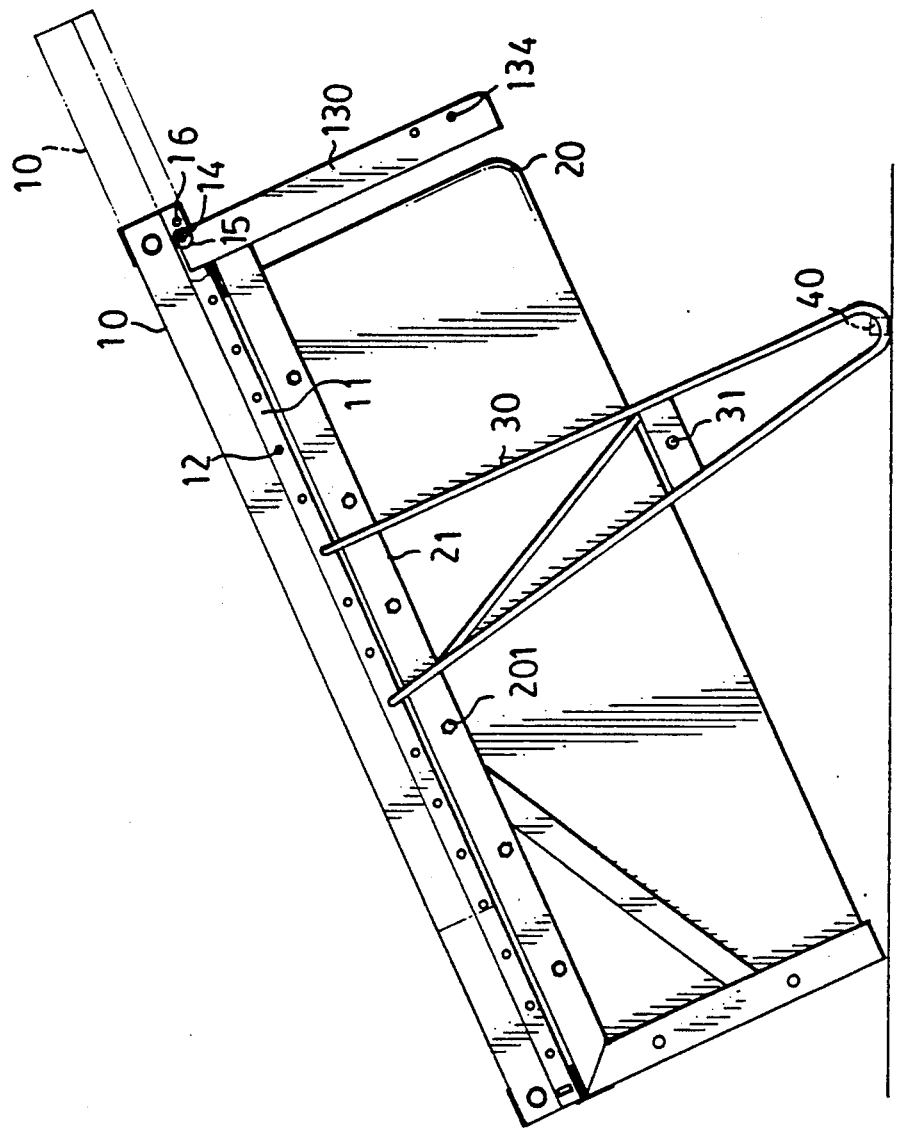
FIG. 2 is a side view of the solar heater assembly.
Figure 3:
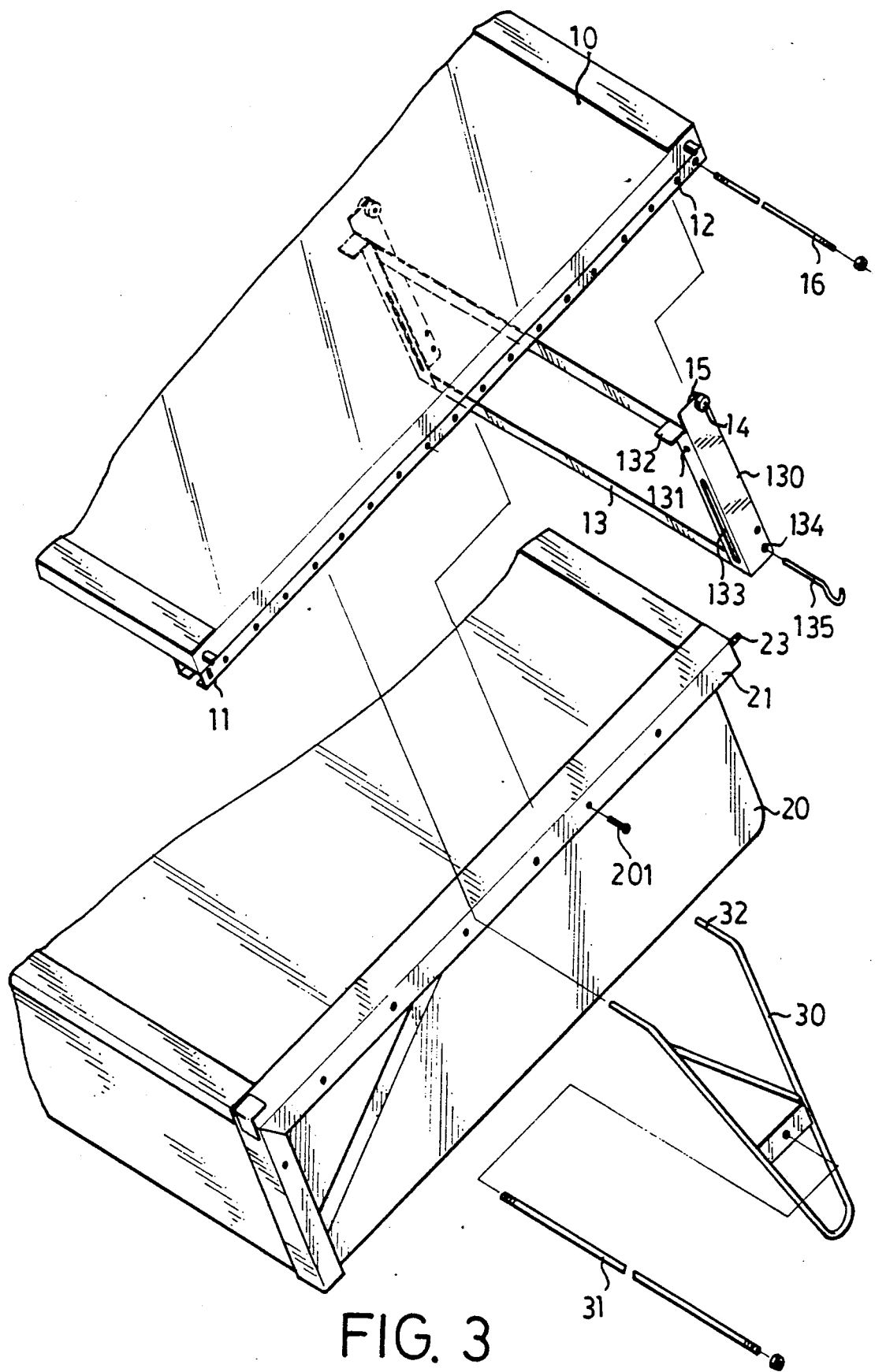
FIG. 3 is an exploded view of the solar heater assembly.
Figure 4:
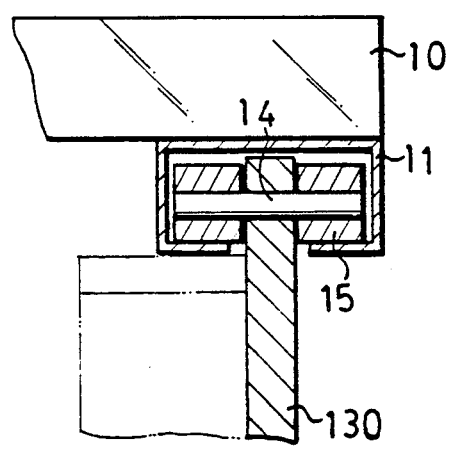
FIG. 4 is a partial cross sectional view of the solar heater assembly.

Referring to the drawings, and initially to FIGS. 1 to 4, a solar heater assembly in accordance with the present invention comprises a solar heater 10 having a rectangular shape, a pair of tracks 11 longitudinally disposed on the lower and side portions of the solar heater 10, a plurality of orifices 12 formed along each of the tracks 11, a bracket 13 including a pair of legs 130, in which only one of the legs 130 is shown in the drawings, each of the legs 130 including an aperture 131, an oblong hole 133 and an ear 132 formed therein, a pair of wheels 15 rotatably supported on one end of each of the legs 130 at an axle 14 and rotatably engaged in the respective tracks 11 such that the bracket 13 is slidable along the tracks 11, best shown in FIG. 4, and a hole 134 formed in the other end of each of the legs 130 for receiving a pin element 135 A rod 16 is laterally disposed in the upper portion of the solar heater 10.

A container 20 is provided for receiving water or other liquid, a frame 21 is fixed on the container 20 by screws 210, a pair of bolts 23 are fixed to the frame 21 and engageable either with the apertures 131 or the oblong holes 133 such that the bracket 13 can be fixed to the frame 21 and the container 20. A pair of supports 30 are coupled together by a post 31 and each includes two limbs 32 formed on one end for engagement with the orifices 12 of the respective tracks 111, the limbs 32 can be engaged with suitable orifices 12 such that the solar heater assembly can be supported with a suitable slope, best shown in FIGS. 1 and 2. The lower ends of the supports 30 can be fixed to the supporting surfaces by fixing elements 40.

Obviously, the limbs 32 of the supports 30 can be adjusted along the orifices 12 of the tracks 11 such that the solar heater 10 can be adjusted or arranged to be faced toward any suitable direction. This is particularly appreciated when seasons changed, for example, the directions of the sun lights are changed gradually from summer to winter. The solar heater 10 can be adjusted such that the solar heater 10 may be directed toward the sun. The solar heater assembly can be adjusted to different angular positions according to the sun shine such that the solar energy absorbing effect is greatly increased.

Figure 5:
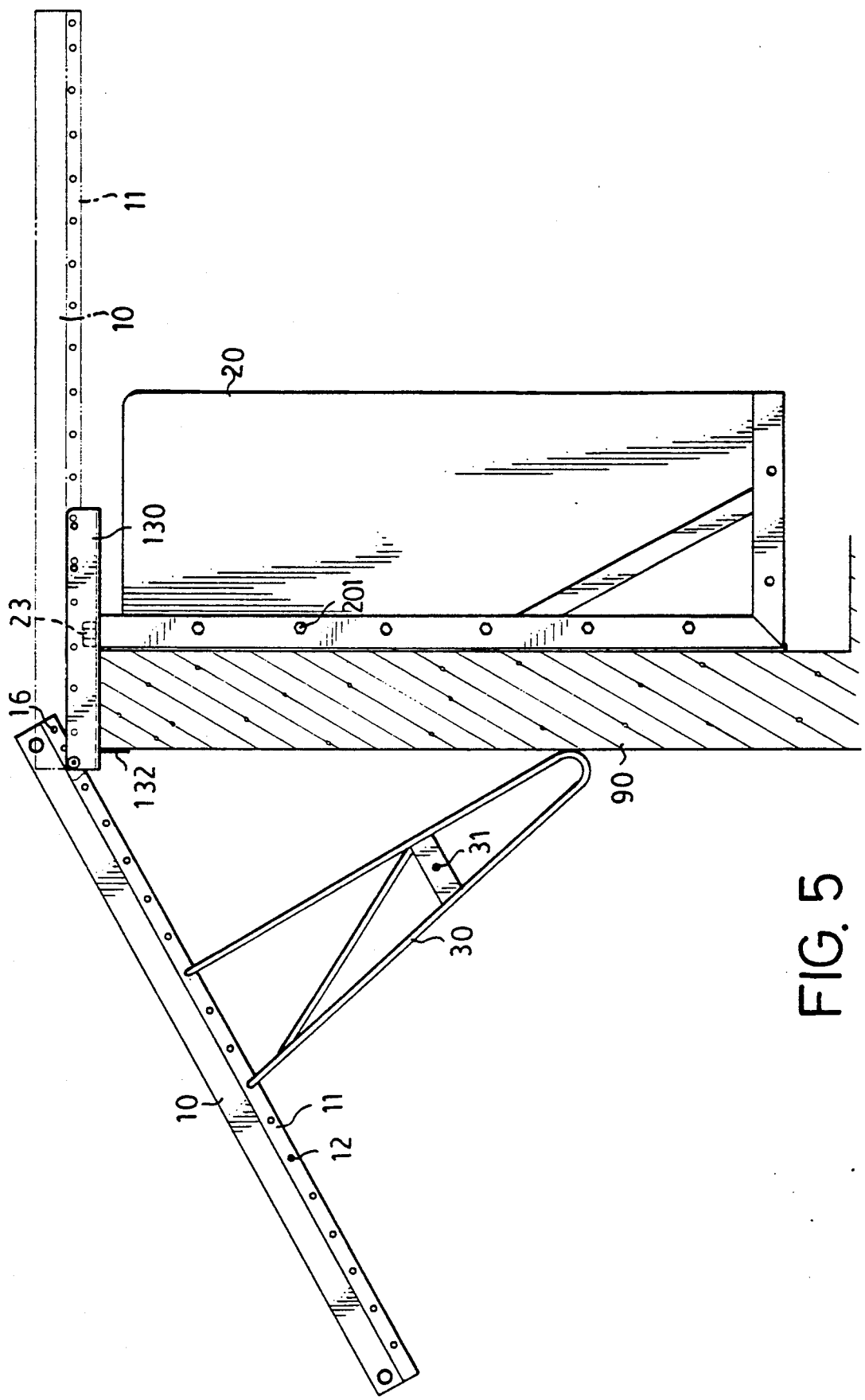
FIG. 5 is a schematic view illustrating the operations of the solar heater assembly.
Figure 6:
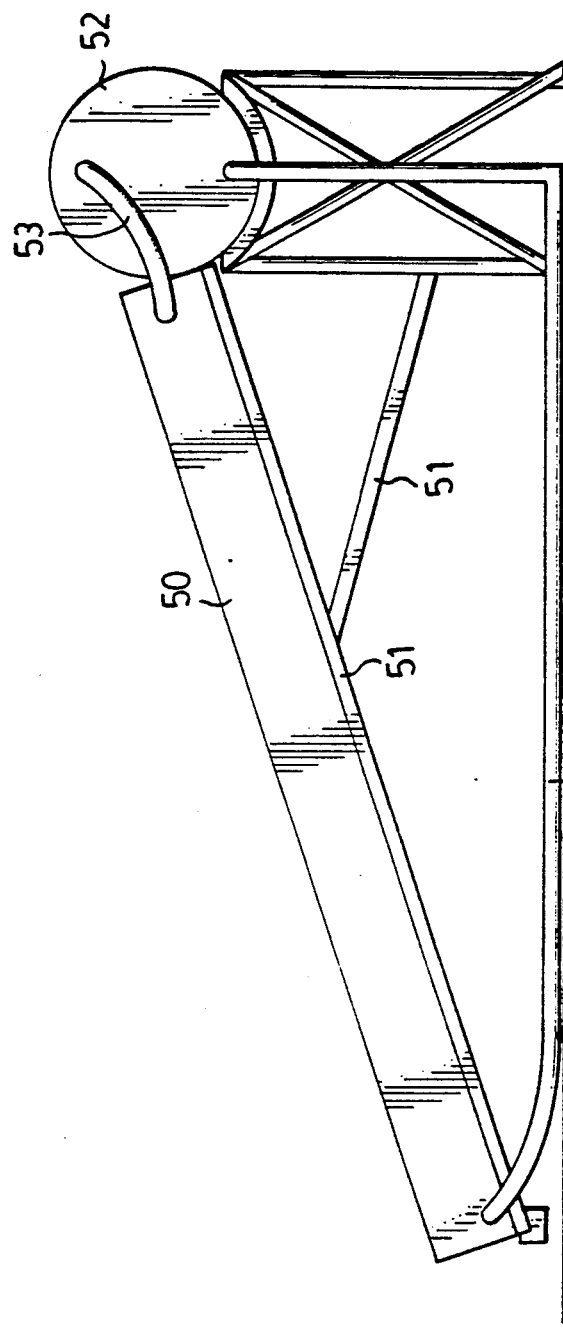
FIG. 6 is a side view of the typical solar heater.

Referring next to FIG. 5, the bracket 13 can be fixed on top of a wall member 90, in which the ear 132 is engaged with the surface of the wall member 90, at this moment, the bolts 23 are slidably engaged in the oblong holes 133 of the legs 130. The container 20 is preferably suspended in the inner portion of the wall member 90. The tracks 11 are slidable relative to the wheels 15 such that the solar heater 10 can be moved between the positions as shown in solid lines and in dotted lines. In addition, the solar heater 10 can be supported with a suitable slope relative to the wall member 90 by the supports 30. The pin element 135 is engageable with either of the orifices 12 of the track 11 such that the tracks 11 can be secured to the legs 130 of the bracket 13.

In addition, the solar heater assembly can be easily dismounted, particularly when hurricane comes.

Accordingly, the solar heater assembly in accordance with the present invention includes an adjustable support such that the facing directions of the solar heater can be adjusted.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter

I claim

1. A solar heater assembly comprising,
   a container for receiving liquid, therein;
   a frame mechanically affixed to said container;
   a bracket mechanically affixed to said frame and having at least one wheel rotatably mounted on one end thereof;
   a solar heater having at least one track disposed along a longitudinal side thereof for receiving said wheel, said track having a plurality of orifices, said solar heater and said track slidable along said wheel relative to said bracket; and at least one support for supporting said solar heater and said container at a predetermined slope, said at least one support having a first end portion for engagement with at least one of said orifices.

2. A solar heater assembly according to claim 1, wherein said bracket includes at least one leg having an oblong hole formed therein, said frame includes a bolt fixed thereon and engaged in said oblong hole of said leg, whereby, said leg of said bracket is adjustable relative to said frame.

3. A solar heater assembly according to claim 1, wherein said support includes a pair of limbs engageable with said orifices of said track so that said support is adjustable along said track.

4. A solar heater assembly according to claim 2, further comprising an ear, said ear extending perpendicularly away from said leg.

5. A solar heater assembly comprising, a container for receiving liquid therein;

a frame mechanically affixed to said container;

a bracket mechanically affixed to said frame and having a pair of wheels rotatably mounted thereon;

a solar heater having two longitudinal sides and a track disposed along each of said longitudinal sides, said track for receiving said wheels, said track having a plurality of orifices, said solar heater and said track slidable along said wheels relative to said bracket; and two supports for supporting said solar heater and said container at a predetermined slope, each said support having a first end portion for engagement with at least one of said orifices.

6. A solar heater assembly according to claim 5, wherein said bracket includes a pair of legs each having an oblong hole formed therein, said frame includes a pair of bolts fixed thereon and engaged in said oblong holes of said legs, whereby, said legs of said bracket are adjustable relative to said frame.

7. A solar heater assembly according to claim 5, wherein said support includes a pair of limbs engageable with said orifices of said track so that said support is adjustable along said track.

8. A solar heater assembly according to claim 6, further comprising an ear, said ear extending perpendicularly away from said leg.

* * * * *

UNITED STATES PATENT AND TRADEMARK OFFICE
CERTIFICATE OF CORRECTION

PATENT NO. : 5,251,610
DATED : October 12, 1993
INVENTOR(S) : Herman Lai It is certified that error appears in the above-identified patent and that said Letters Patent is hereby corrected as shown below:

Column 2, line 14, after "tracks", delete "111" and insert therefor 11

Column 2, line 59, after "hereinafter", insert claimed.

Signed and Sealed this

Thirteenth Day of December, 1994

Attest:

BRUCE LEHMAN

*Attesting Officer*  *Commissioner of Patents and Trademarks*